W. F. EMERSON.
DRIVING AND BRAKING MECHANISM.
APPLICATION FILED NOV. 26, 1915. RENEWED NOV. 17, 1918.
1,280,428. Patented Oct. 1, 1918.
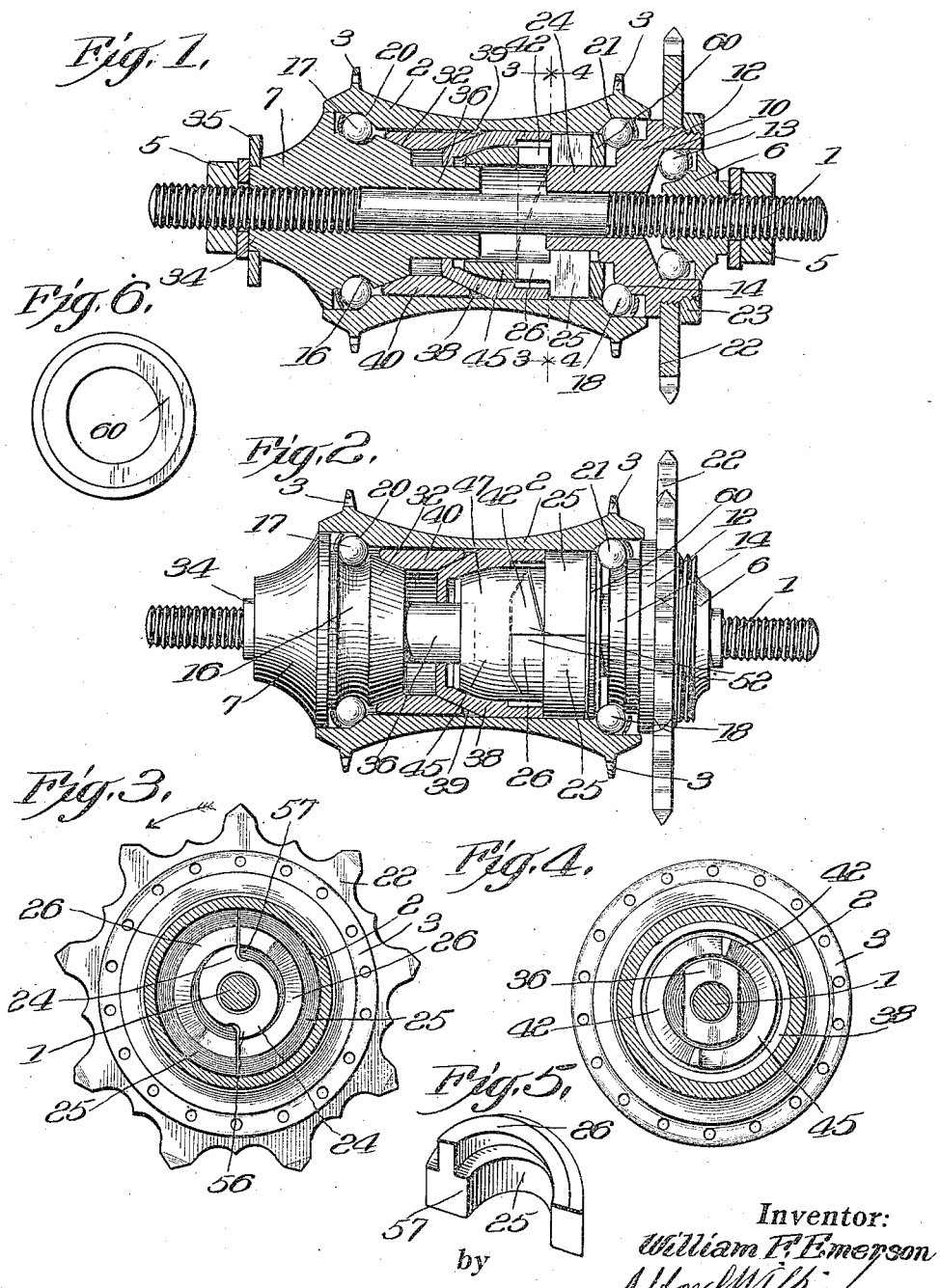
Inventor:
William F. Emerson

UNITED STATES PATENT OFFICE.

WILLIAM F. EMERSON, OF BUFFALO, NEW YORK.

DRIVING AND BRAKING MECHANISM.

1,280,428.    Specification of Letters Patent.    Patented Oct. 1, 1918.

Application filed November 26, 1915, Serial No. 63,361. Renewed November 17, 1917. Serial No. 202,644.

*To all whom it may concern:*

Be it known that I, WILLIAM F. EMERSON, a citizen of the United States, residing at Buffalo, in the county of Erie and State of New York, have invented new and useful Improvements in Driving and Braking Mechanism, of which the following is a specification.

My invention relates to a driving and braking mechanism for wheels and it is devised particularly for improvement in coaster brake construction and to that end provides for successfully performing the requisite functions of a coaster brake in a reliable and efficient manner. In operation, on the forward rotation of the driving member, a clutch is thrown into engagement to cause a similar forward rotation of the driving wheel, while a reverse rotation of the driving member operates a suitable brake to cause a braking action on the hub. When the driving member is at rest or released the hub is permitted to revolve freely on its bearings for coasting in the forward direction and to permit of freely trundling the wheel backwardly.

The improved mechanism of my invention is designed to be of few and substantial parts and to be positive and quickly responsive in its operation. An important feature thereof resides in an improved arrangement of the braking parts which afford a greatly increased braking surface and operate in an improved manner to produce a uniform and smooth braking action.

The aforementioned and other desirable features of my improved device will be readily understood by reference to the accompanying drawing wherein the reference characters of this description are applied to like parts in the several views.

In the drawing Figure 1 is a vertical longitudinal sectional view of a brake constructed to embody the features of my invention. Fig. 2 is a horizontal longitudinal sectional view with certain of the parts shown in elevation. Fig. 3 is a cross sectional view on line 3—3 of Fig. 1 looking toward the right. Fig. 4 is a similar view on line 4—4 of Fig. 1 looking toward the left. Fig. 5 is a detail view in perspective illustrating one of the wedge and cam segments, and Fig. 6 is a plan view of the retarding washer.

In the approved form of my invention here shown, 1 indicates the stationary axle or spindle for the wheel hub, rigidly supported in the rear forks or frame members of a bicycle and fixed in position by the securing nuts 5—5 threaded on the axle at each end thereof. The hub barrel 2, forming a casing for the parts, is journaled to rotate about the axle in the manner to be described and has integrally formed thereon the usual spoke flanges 3—3.

On each end of the axle there are threaded inner bearing members, at the right the conical bearing 6 and at the left the brake and bearing member 7. The bearing 6, as shown, co-acts with an internal cup-cone or ball race 10, of a driving member 12, in forming a race-way for interposed bearing balls 13 upon which the driving member is journaled to rotate upon bearing cone 6. The driving member 12 is formed also to provide the exterior or peripheral conical bearing 14. The brake-bearing member 7 is formed to provide a peripheral bearing groove 16. The hub is formed with outwardly directed curved surfaces or ball-races 20—21 which are distanced to be complemental to the bearing 14 and groove 16 in providing raceways for the ball-bearings 17 and 18. The arrangement thus provides for journaling of the hub at the left upon the brake-bearing member and at the right upon the driving member 12 and as will be seen the hub is arranged symmetrical in form and in the diameter of the ball races 20—21 thereby permitting of its being reversed in position.

Normally the hub barrel is permitted to rotate independently and freely on its bearings 17 and 18 which occurs when the wheel hub moves forwardly with respect to the operating member or in either direction when the operating member is at rest. However, when the operating member is rotated means are provided to be actuated thereby on its forward rotation to effect the coupling or locking of the hub to the operating member to be propelled therewith while on the reverse movement of the operating member a brake mechanism is actuated frictionally to engage the hub so as to retard or stop the rotation of the wheel.

Suitable operating means are provided for rotating the operating member 12 and it is here shown as a sprocket wheel 22 threaded onto the operating member and secured by a locking nut 23. Radially acting cams or eccentrics 24 are formed on an integral sleeve extension of the operative member and interposed between said cams and the hub are arranged the propelling segments 25 in the manner shown in Fig. 3. On the forward rotation of the operating member the cam surfaces force the segments outwardly into engagement with the inner peripheral surface of the hub barrel thereby, by their wedging action, to couple the operating member and the hub to rotate together for propelling the wheel.

For operating the braking parts upon the reverse rotation of the operating member I have provided reversely acting lateral cams 26 integrally formed on the segments 25. These lateral cams are adapted to effect the operation of an improved braking mechanism which is designed to give a large area of braking surface. The parts thereof comprise an integral, conical portion 32 formed on the brake bearing member 7. This member 7 has formed on its outer face a squared shoulder 34 engaged by the usual similarly apertured, securing arm 35 which is attached to the bicycle frame thereby to hold the member 7 from rotation or it may be held in any other suitable way. Inwardly projecting from the member 7 there is provided an integral squared sleeve portion 36 entering a squared aperture in a conical brake-sleeve 38 provided on its exterior with a conical portion 39 inclined reversely with reference to the surface 32 and conjointly therewith providing stationary brake expanding surfaces. A split friction sleeve 40 is interposed between the interior of the hub barrel 2 and the conical surfaces 32—39 and has co-acting inclined interior surfaces to be engaged by the surfaces 32 and 39 to cause it to be expanded into frictional engagement with the internal surface of the hub barrel.

The expanding of the friction sleeve is effected by longitudinal movement of the brake-sleeve 38 toward the portion 32. It is so moved by the action of the lateral cams 26 engaging co-acting cams 42 integrally formed on a shiftable brake-operating member 45 having an exterior conical surface 47 arranged to engage the interior surface of the brake-sleeve to move the latter for expanding the friction sleeve 40.

The engagement of the conical surface 47 with the co-acting surface of sleeve 38 retards the brake-operating member 45 from rotative movement thus insuring relative movement of the cams 26—43 and the resulting longitudinal movement of the member 45 to operate the brake. A positive connection is effected by the engagement of shoulders 56 of the radial cams 24 with abutting shoulders 57 on the segments whereby the cams 26 are positively rotated by the operating member on the reverse rotation of the sprocket for setting the brake. A similar positive connection is afforded between the clutch segments 25 and the brake operating member 45 on the propelling movement of the parts whereby the latter is inactively rotated therewith. This latter occurs by reason of the engagement of the abutting shoulders 52 formed by the abrupt termination of the high portions of the lateral cams 26—42.

The engagement between the segments and brake-operating member, whereby the latter is rotatively connected to the segments during propelling operates to insure the movement of the radial cams 24 relative to the clutch segments 25 by their retarding action or drag thereon. In consequence the coupling of the segments to the hub is effected in a positive and quickly responsive manner.

The engagement between the segments and brake operating member is also a factor in permitting of the wheel being trundled backwardly without setting of the brakes for the retarding action on the segments, resulting from the engagement of the lateral cams 26—42, overcomes the tendency of the segments riding up on the radial cams 24 and thereby coupling to the then moving hub. Should the latter occur the cam would be carried around so as to cause setting of the brake. Further to overcome the tendency to set the brake under the described conditions I have arranged a washer 60 interposed between the segments and the bearings 21 thereby by frictional engagement with the segments to further retard their movement and to prevent their engaging the balls.

The operation as will be understood from the foregoing is to effect a direct coupling of the driving member 12 with the hub 2 through the action of the clutch segments 25 upon the forward or propelling movement of the driving member. Upon its reverse movement the action of the lateral cams 26—43 as described will cause the brake-ring or friction sleeve 40 to be expanded into braking engagement with the hub and upon relieving the driving member of the driving or braking force the wheel hub is permitted to rotate freely for coasting or for trundling of the bicycle backwardly. The devices as constructed are possessed of great strength and are quickly responsive in their action both for driving and braking. The form of the parts for the latter purpose are designed to produce a uniform braking action for it will be seen that the friction sleeve has frictional engagement with both the hub, externally and the stationary members, internally, so that there is present a differential braking engagement insuring uniformity and smoothness in its action.

While I have illustrated a desirable embodiment of the invention it will be understood that many changes can be made without departing from the scope thereof. It is therefore intended that all matter contained herein shall be interpreted as illustrative and not in a limiting sense.

Having described my invention I claim,

1. In a driving and braking mechanism, the combination with the hub and the axle, of a driving member suitably journaled, cam surfaces on the driving member, a stationary brake member, a coacting movable brake member, a laterally movable brake operating member having cam surfaces thereon, and clutch segments arranged to be acted on by the driving-member cams to couple said latter member to the hub and said segments having laterally acting cam surfaces thereon operative to shift the brake operating member upon reverse rotation to effect setting of the brake, substantially as described.

2. In a driving and braking mechanism, the combination with the hub and the axle, of a driving member suitably journaled, cam surfaces on the driving member, a stationary brake member, a coacting movable brake member, a brake operating member adapted to engage the movable brake member, and clutch segments adapted to be acted on by the driving member cams for coupling said latter member to the hub, said segments having cam surfaces thereon operative to engage the brake operating member for setting the brake upon reverse rotation of the driving member and said segments being rotatively connected to the driving member on the reverse rotation thereof and similarly connected to the brake-operating member during forward rotation of the driving member substantially as described.

3. In a driving and braking mechanism the combination with the hub and the axle, of a driving member suitably journaled, cam surfaces on the driving member, a stationary brake member, a coacting movable brake member, a laterally movable brake operating member having frictional engagement with the movable brake member, clutch segments arranged to be acted on by the driving member cams to couple said member to the hub, said segments having laterally acting cam engagement with the brake operating member to effect setting of the brake upon reverse rotation of the driving member, engaging means between the segments and the driving member rotatively to connect said members on the reverse movement of the driving member and engaging means between the brake-operating member and said segments rotatively to connect said brake member and segments upon propelling rotation of the latter, substantially as described.

4. In a driving and braking mechanism, the combination with the hub and the axle, of a driving member suitably journaled, radially acting cam surfaces on the driving member, a stationary member, a co-acting movable brake member, a laterally movable brake operating member having cam surfaces thereon, clutch segments arranged to be acted on by the driving-member cams to couple said driving member to the hub, said segments having laterally acting cam surfaces thereon operative to shift the brake-operating member upon reverse rotation to effect setting of the brake and an annular engaging member frictionally to engage the segments to produce a retarding action thereon substantially as described.

5. In a driving and braking mechanism the combination with the hub and the axle, of a driving member suitably journaled, radially acting cam surfaces on the driving member, a stationary brake-member having a tapered braking surface, a co-acting movable brake member having an opposed tapered braking surface, means to secure the movable brake member from rotation, an expansible friction sleeve interposed between the brake members and the hub, a laterally movable brake operating member having cam surfaces thereon, clutch segments arranged to be acted on by the driving member cams, to couple said driving member to the hub, said segments having laterally acting cam surfaces thereon operative to shift the brake operating member upon reverse rotation to effect setting of the brake and said segments being rotatively connected to the driving member on the reverse rotation thereof and similarly connected to the brake-operating member during forward rotation of the driving member substantially as described.

6. In a driving and braking mechanism, the combination with the hub and the axle, of a driving member suitably journaled radially acting cam-surfaces on the driving member, a stationary brake-member having a tapered braking surface, a coacting movable brake-member having an opposed tapered braking surface and an internal conical surface, means to secure the movable brake-member from rotation, an expansible friction sleeve interposed between the brake-member and the hub, a laterally movable brake operating member having an external conical portion frictionally to engage said internal conical surface and lateral cam surfaces thereon, clutch segments arranged to be acted on by the driving member cams to couple said driving member to the hub, said segments having laterally acting cams thereon to engage the brake-operating member for shifting the latter to set the brake and said segments and driving member having opposing shoulders adapted to engage upon the reverse rotation of the driving member and said segments and brake operating member having opposed shoulders to engage upon the propelling rotation of the drive member substantially as described.

7. In a driving and braking mechanism, the combination with the hub and the axle, of a driving member suitably journaled radially acting cam-surfaces on the driving member, a stationary brake-member having a tapered braking surface, a coacting movable brake-member having an opposed tapered braking surface, and an internal conical surface means to secure the movable brake-member from rotation, an expansible friction sleeve interposed between the brake-members and the hub, a laterally movable brake operating member having an external conical portion frictionally to engage said internal conical surface and lateral cam surfaces thereon, clutch segments arranged to be acted on by the driving member, cams to couple said driving member to the hub, said segments having laterally acting cams thereon to engage the brake operating member for shifting the latter to set the brake and said segments and driving member having opposing shoulders adapted to engage upon the reverse rotation of the driving member and said segments and brake operating member having opposed shoulders to engage upon the propelling rotation of the drive member, said hub and driving member having coacting raceways, bearing balls fitted thereto and a friction washer interposed between the segments and the balls substantially as described.

8. In a driving and braking mechanism the combination with a hub and an axle, of a driving member suitably journaled and provided with cam means, propelling segments within the hub arranged to be acted on by the cam means of the driving member on forward rotation of the latter to couple the driving member to the hub, braking means, operating means for the braking means and said propelling segments having cam surfaces thereon adapted to actuate the brake operating means to cause the latter to set the brake upon the reverse rotation of the driving member, substantially as described.

9. In a driving and braking mechanism, the combination with a hub and an axle, of a driving member suitably journaled and provided with radially acting cam means, propelling segments within the hub arranged to be acted on by the radial cam means on forward rotation of the driving member to couple the latter to the hub, braking means, operating means for the braking means and said propelling segments having laterally acting cam surfaces thereon adapted to actuate the brake operating means to cause the latter to set the brake upon the reverse rotation of the driving member, substantially as described.

10. In a driving and braking mechanism, the combination with the hub and the axle, of a driving member suitably journaled and provided with cam surfaces thereon, propelling segments within the hub arranged to be acted on by the drive member cam surfaces on forward rotation of the driving member to couple the latter to the hub, braking means, operating means for the braking means and said propelling segments having cam surfaces thereon adapted to actuate the brake operating means to cause the latter to set the brake upon reverse rotation of the driving member and said segments being rotatively connected to the driving member on the reverse rotation thereof substantially as described.

In testimony whereof I have signed my name to this specification.

WILLIAM F. EMERSON.

Copies of this patent may be obtained for five cents each, by addressing the "Commissioner of Patents, Washington, D. C."